United States Patent
Lewis et al.

(10) Patent No.: US 7,293,406 B2
(45) Date of Patent: *Nov. 13, 2007

(54) ENGINE CONTROL FOR LOW EMISSION VEHICLE STARTING

(75) Inventors: Donald James Lewis, Howell, MI (US); James Michael Kerns, Trenton, MI (US); Matthew John Gerhart, Dearborn Heights, MI (US); Ralph Wayne Cunningham, Milan, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 368 days.

This patent is subject to a terminal disclaimer.

(21) Appl. No.: 10/692,413

(22) Filed: Oct. 22, 2003

(65) Prior Publication Data

US 2004/0083718 A1    May 6, 2004

Related U.S. Application Data

(63) Continuation of application No. 10/064,432, filed on Jul. 12, 2002, now Pat. No. 6,640,539, and a continuation of application No. 10/064,430, filed on Jul. 12, 2002, now Pat. No. 6,666,021, and a continuation of application No. 10/064,433, filed on Jul. 12, 2002, now Pat. No. 6,715,280.

(51) Int. Cl.
$F01N 3/00$ (2006.01)

(52) U.S. Cl. ............... 60/284; 60/274; 60/285; 60/289; 123/406.23; 123/699

(58) Field of Classification Search ......... 60/274, 60/284, 285, 289, 290, 292, 293, 300; 123/406.23, 123/406.44, 406.55, 676, 699
See application file for complete search history.

(56) References Cited

U.S. PATENT DOCUMENTS

| | | | |
|---|---|---|---|
| 4,699,176 A | 10/1987 | Paddock | |
| 5,136,842 A | 8/1992 | Achleitner et al. | |
| 5,271,223 A | 12/1993 | Hoshi | |
| 5,345,763 A | 9/1994 | Sato | |
| 5,357,749 A * | 10/1994 | Ohsuga et al. | 60/274 |
| 5,388,401 A | 2/1995 | Nishizawa et al. | |
| 5,459,999 A | 10/1995 | Hosoya et al. | |
| 5,497,745 A | 3/1996 | Cullen et al. | |
| 5,517,848 A | 5/1996 | Hosoya et al. | |
| 5,560,202 A | 10/1996 | Hosoya et al. | |
| 5,615,552 A | 4/1997 | Shimasaki et al. | |

(Continued)

FOREIGN PATENT DOCUMENTS

GB    1516184    8/1975

*Primary Examiner*—Binh Q. Tran
(74) *Attorney, Agent, or Firm*—Allan J. Lippa; Alleman Hall McCoy Russell & Tuttle LLP

(57) ABSTRACT

A method for rapidly heating an emission control device in an engine exhaust uses excess air added to the exhaust via an air introduction device. After an engine cold start, the engine is operated to raise exhaust manifold temperature to a first predetermined value by operating the engine with a lean air-fuel ratio and retarded ignition timing. Once the exhaust manifold reaches the predetermined temperature value, the engine is switched to operate rich and air is added via the air introduction device. The added air and rich exhaust gas burn in the exhaust, thereby generating heat and raising catalyst temperature even more rapidly. The rich operation and excess air are continued until either engine airflow increases beyond a pre-selected value, or the emission control device reaches a desired temperature value. After the emission control device reaches the desired temperature, the engine is operated substantially around stoichiometry. Further, a method is described for adaptively learning pump airflow using feedback from an exhaust gas oxygen sensor.

21 Claims, 15 Drawing Sheets

U.S. PATENT DOCUMENTS

| | | |
|---|---|---|
| 5,657,625 A | 8/1997 | Koga et al. |
| 5,735,120 A | 4/1998 | Nagai |
| 5,735,121 A | 4/1998 | Kato et al. |
| 5,752,492 A | 5/1998 | Kato et al. |
| 5,894,724 A | 4/1999 | Minowa et al. |
| 5,950,419 A | 9/1999 | Nishimura et al. |
| 5,974,790 A | 11/1999 | Adamczyk et al. |
| 5,992,143 A | 11/1999 | Manaka et al. |
| 6,044,643 A | 4/2000 | Uttber et al. |
| 6,085,517 A | 7/2000 | Bayerle et al. |
| 6,155,043 A | 12/2000 | Zhang et al. |
| 6,640,539 B1 * | 11/2003 | Lewis et al. .......... 60/284 |
| 6,666,021 B1 * | 12/2003 | Lewis et al. .......... 60/289 |
| 6,715,280 B2 * | 4/2004 | Lewis et al. .......... 60/274 |
| 6,918,245 B2 * | 7/2005 | Hirooka et al. ........ 60/289 |
| 7,111,454 B2 * | 9/2006 | Fulcher et al. ........ 60/289 |
| 7,146,803 B2 * | 12/2006 | Streib ................ 60/289 |

* cited by examiner

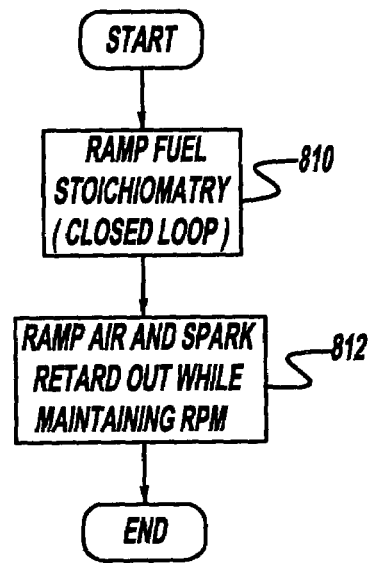
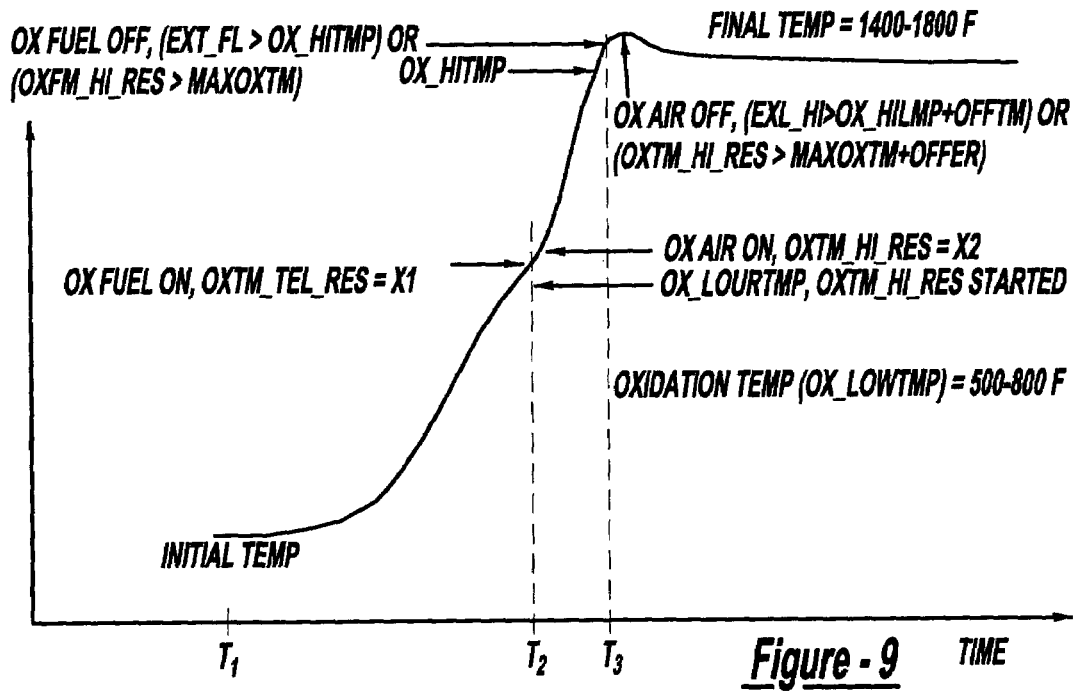

ENGINE CONTROL FOR LOW EMISSION VEHICLE STARTING

CROSS-REFERENCE TO RELATED APPLICATIONS

This application is a continuation application of Ser. No. 10/064,432 filed Jul. 12, 2002 now U.S. Pat. No. 6,640,539 and is hereby incorporated by reference. This application also claims the priority under 35 U.S.C. § 120, and is a continuation application, of the following U.S. patent applications, which are hereby incorporated by reference in their entirety for all purposes: U.S. patent application Ser. No. 10/064,430, filed Jul. 12, 2002 now U.S. Pat. No. 6,666,021; and U.S. patent application Ser. No. 10/064,433, filed Jul. 12, 2002 now U.S. Pat. No. 6,715,280.

FIELD OF THE INVENTION

The present invention relates generally to the control of an internal combustion engine having an air introduction device in the engine exhaust.

BACKGROUND OF THE INVENTION

To reduce engine emissions, it is desirable to rapidly heat catalytic converters in the engine exhaust. In other words, catalytic converters achieve higher emission reduction after they have reached a predetermined operating temperature. Thus, to lower vehicle emissions, various methods are available to raise catalyst temperature as fast as possible.

In one approach, during the warm up phase of the catalytic converter, the engine ignition timing is retarded, and the engine air-fuel combustion mixture is set lean of stoichiometry. In this way, the retarded ignition timing provides additional heat to the engine exhaust, while the lean air-fuel mixture produces minimal hydrocarbons. In this way, catalyst temperature is rapidly increased, while minimizing hydrocarbon emissions. Such a system is cited in U.S. Pat. No. 5,497,745.

The inventors of the present invention have recognized that a disadvantage with the above approach is that the amount of ignition timing retard is limited by combustion stability. This, in turn, limits the maximum amount of heat that can be added to the catalytic converter and thereby limits the ability to increase catalyst light-off times.

Another approach to providing heat in the exhaust is to operate the engine with a rich air-fuel mixture while providing additional air directly into the engine exhaust. Such a system is described in U.S. Pat. No. 5,136,842.

The inventors herein have also recognized a problem with the above approach. In particular, the inventors have discovered that increased exhaust emissions may result due to incomplete burning of the excess hydrocarbons and injected airflow in the exhaust system. In other words, if the exhaust temperature is too low, complete burning in the exhaust manifold upstream of the catalytic converter may not occur. Also, the inventors herein have recognized that the engine fuel economy suffers while operating the engine rich and providing the additional air directly into the engine exhaust. In other words, the excess fuel added to provide a rich air-fuel ratio (and which provides heat via an exothermic reaction in the engine exhaust) detracts from vehicle fuel economy.

SUMMARY OF THE INVENTION

The above disadvantages with prior approaches are overcome by a method for operating an engine with an emission control device in an exhaust system of the engine, and an air introduction device coupled to the engine exhaust system. The method comprises: after an engine start, operating the engine with ignition timing retarded from optimal torque timing and combusting a lean air-fuel mixture; continuing said operation until an exhaust system temperature reaches a pre-selected value; and after reaching said pre-selected temperature value, operating the engine with a rich air-fuel mixture and commencing adding of air via said air introduction device.

By waiting until the exhaust temperature reaches a pre-selected value (for example, a manifold auto-ignition temperature), it is possible to minimize the chance of unburned fuel passing through the exhaust system. Further, it is possible to use as little fuel as possible to achieve the desired rapid catalyst heating. In other words, the present invention withholds adding excess fuel to the engine until the exhaust temperature has reached a value that will support auto ignition of the rich exhaust gases and excess air introduced via the air introduction device.

Note that there are various methods for indicating when exhaust temperature reaches a pre-selected value. For example, an exhaust temperature sensor can be used which measures exhaust manifold temperature. Alternatively, the engine controller can estimate exhaust temperature based on various operating conditions such as, for example: intake air temperature, engine speed, ignition timing, and engine air-fuel ratio.

An advantage of the above aspect of the present invention is reduced emission due to decreased catalyst light-off times.

BRIEF DESCRIPTION OF THE DRAWINGS

The advantages described herein will be more fully understood by reading an example of an embodiment in which the invention is used to advantage, referred to herein as the Description of the Preferred Embodiment, with reference to the drawings wherein:

FIGS. 2-8 and 13-14 are high level flowcharts of various routines for controlling engine and components according to the present invention;

FIGS. 9-11 and 15 are graphs illustrating operation according to one aspect of the present invention.

DESCRIPTION OF THE PREFERRED EMBODIMENT

Figure 1:
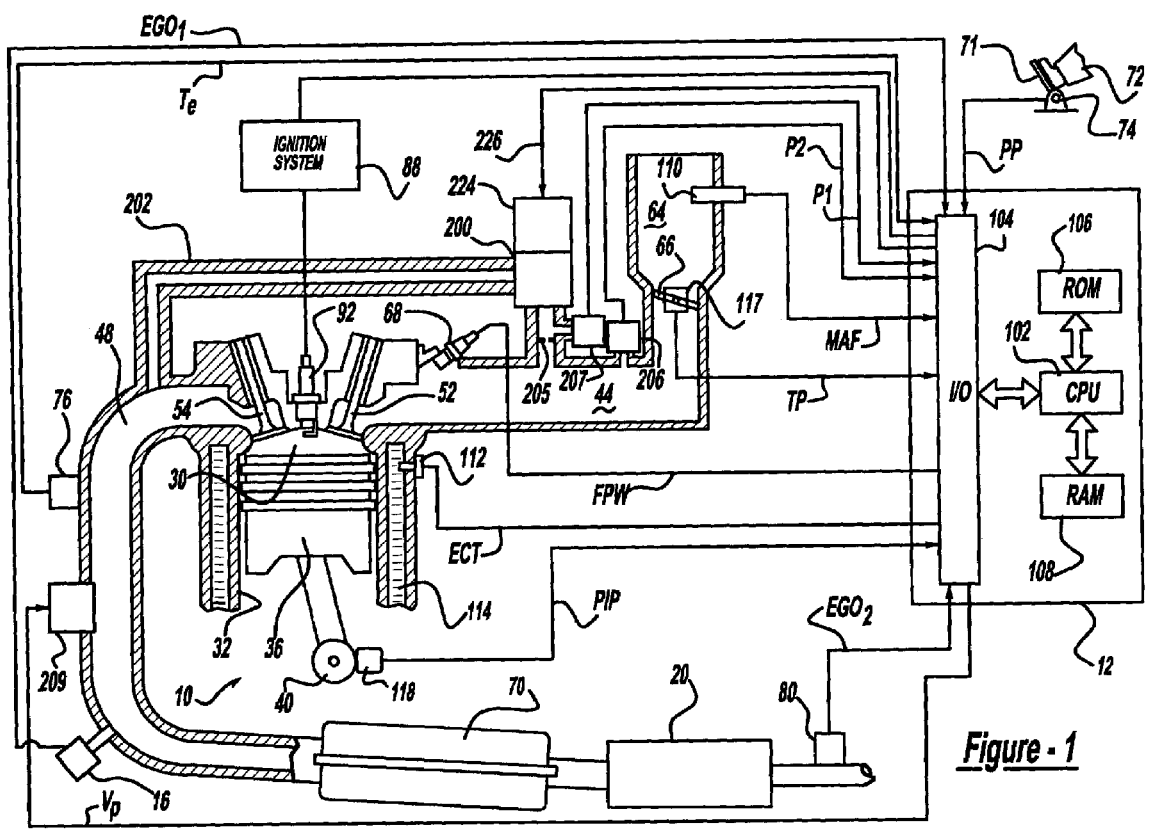
FIG. 1 is a block diagram of an engine in which the invention is used to advantage.

Internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. In general terms, which are described later herein, controller 12 controls engine air/fuel ratio in response to feedback variable FV derived from two-state exhaust gas oxygen sensor 16.

As described above, two-state exhaust gas oxygen sensor 16 is shown coupled to exhaust manifold 48 upstream of catalytic converter 20. Two-state exhaust gas oxygen sensor 80 is also shown coupled to exhaust manifold 48 downstream of catalytic converter 20. Sensor 16 provides signal EGO1 to controller 12 which converts signal EGO1 into two-state signal EGOS1. A high voltage state of signal EGOS1 indicates exhaust gases are rich of a reference air/fuel ratio and a low voltage state of converted signal EGO1 indicates exhaust gases are lean of the reference air/fuel ratio. Sensor 80 provides signal EGO2 to controller 12 which converts signal EGO2 into two-state signal EGOS2. A high voltage state of signal EGOS2 indicates exhaust gases are rich of a reference air/fuel ratio and a low voltage state of converted signal EGO1 indicates exhaust gases are lean of the reference air/fuel ratio.

Intake manifold 44 communicates with throttle body 64 via throttle plate 66. In one embodiment, an electronically controlled throttle can be used without an air bypass valve. In this case, the airflow is controlled via the throttle instead of using the idle air bypass valve around the throttle plate. If a mechanical throttle (linked via a wire to pedal 70) is used, then the air bypass valve is used to electronically adjust air around the throttle 66, as is known in the art. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown). Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of manifold pressure (MAP) from manifold pressure sensor 116 coupled to intake manifold 44; a measurement of throttle position (TP) from throttle position sensor 117 coupled to throttle plate 66; and a profile ignition pickup signal (PIP) from Hall effect sensor 118 coupled to crankshaft 40 indicating and engine speed (N). Further, controller 12 receives a measurement of manifold temperature (Te) from sensor 76. Alternatively, sensor 76 can provide an indication of exhaust gas temperature, or catalyst temperature.

Further still, downstream sensor 80, provides a measurement of air-fuel ratio downstream of emission control device 20. In one example, as described above, sensor 80 is a switching EGO type sensor. In another, sensor 80 provides an indication of air-fuel ratio (or relative air-fuel ratio) over a range of air-fuel ratios. In this case, the sensor 80 is known as a UEGO sensor.

Exhaust gas is delivered to intake manifold 44 by a conventional EGR tube 202 communicating with exhaust manifold 48, EGR valve assembly 200, and EGR orifice 205. Alternatively, tube 202 could be an internally routed passage in the engine that communicates between exhaust manifold 48 and intake manifold 44. Pressure sensor 206 communicates with EGR tube 202 between valve assembly 200 and orifice 205. Pressure sensor 207 communicates with intake manifold 44. Stated another way, exhaust gas travels from exhaust manifold 44 first through valve assembly 200, then through EGR orifice 205, to intake manifold 44. EGR valve assembly 200 can then be said to be located upstream of orifice 205. Also, pressure sensor 206 can be either absolute pressure sensor or a gauge pressure sensor. Further, pressure sensor 207 can be either an absolute pressure sensor or a gauge pressure sensor. Further yet, pressure sensor 206 can be an absolute pressure sensor, while pressure sensor 207 can be a gauge pressure sensor.

The flow sensors provide a measurement of manifold pressure (MAP) and pressure drop across orifice 205 (DP) to controller 12. Signals MAP and DP are then used to calculate EGR flow. EGR valve assembly 200 has a valve position (not shown) for controlling a variable area restriction in EGR tube 202, which thereby controls EGR flow. EGR valve assembly 200 can either minimally restrict EGR flow through tube 202 or completely restrict EGR flow through tube 202. Vacuum regulator 224 is coupled to EGR valve assembly 200. Vacuum regulator 224 receives actuation signal (226) from controller 12 for controlling valve position of EGR valve assembly 200. In a preferred embodiment, EGR valve assembly 200 is a vacuum actuated valve. However, any type of flow control valve may be used such as, for example, an electrical solenoid powered valve or a stepper motor powered valve.

Finally, air introduction device 209 is coupled to exhaust manifold 48, upstream of catalyst 20. Controller 12 sends a command voltage (Vp) to control device 209. Device 209 can be an air pump, which pumps ambient air into exhaust manifold 48. The amount of air pumped depends on the command signal voltage (Vp). Signal Vp can be a voltage signal, a duty cycle, a frequency modulated signal, or any other such type signal to transmit the command information to device 209. In one example, the air pump is an electrically powered device. More details of the exemplary system are described in more detail with reference to FIG. 12.

Further, drive pedal 70 is shown, along with a driver's foot 72. Pedal position (pp) sensor 74 measures angular position of the driver actuated pedal.

Figure 2:
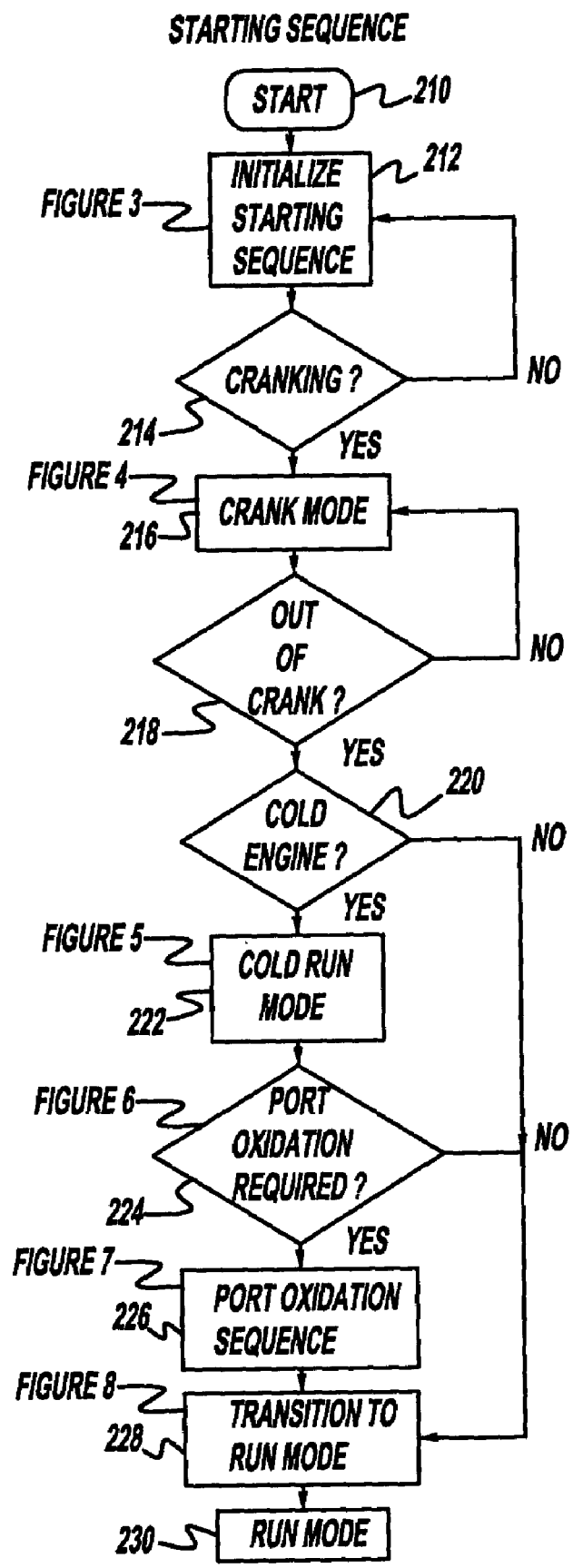

Referring now to FIG. 2, a summary high-level flow chart is described. This summary flow chart describes the vehicle/engine starting sequence using port oxidation (air introduced into the engine exhaust). The routine starts at step 210. Then, at step 212, the starting sequence is initialized (see FIG. 3). Generally, environmental sensors such as engine coolant temperature, ambient air temperature, barometric pressure, battery voltage, and engine off time are used to calculate compensation for the air pump (i.e., to compensate for temperature, pressure, and voltage). In other words, the present invention controls voltage Vp to obtain a desired amount of air introduced via pump 209. Since the amount of air for a given voltage depends on these environmental conditions, the present invention adjusts the pump command to compensate for variation in these environmental conditions. For example, at altitude, less air is introduced for a given voltage command compared to sea level. As such, when operating at altitude, a higher voltage is commanded to provide a given desired air introduction amount. Thus, the present invention achieves more accurate air estimate, air control, and therefore more accurate open loop air-fuel control during the port oxidation mode.

Alternatively, this variation can be compensated for by adjusting fuel injection, with fuel injection also potentially being adjusted via feedback from exhaust air-fuel ratio sensor. Such an approach is described in FIGS. 13-15.

Further, these environmental sensors are also used to calculate fuel delivery and idle air bypass valve position (or position of an electronic throttle, if equipped). Further, these parameters are used to determine whether port oxidation is required.

Then, at step 214, the routine determines whether the engine is cranking. When the answer to step 214 is "no", the routine returns to step 212. Otherwise, when the engine is being cranked, the routine continues to step 216.

Figure 4:
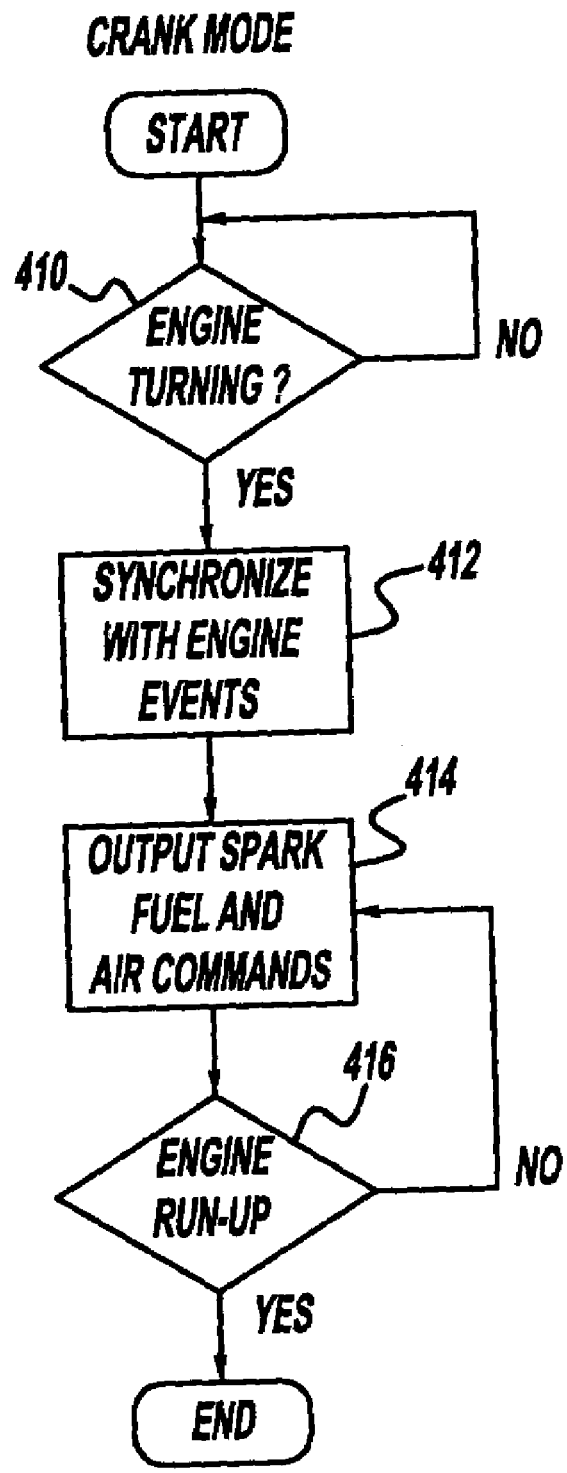

Step 216 describes the engine crank mode, which is more fully described with regard to FIG. 4. In general terms, the crank mode is active while the engine starter is engaged and the engine has not reached a point where it can maintain its speed. During this mode, the desired air entering the engine, the fuel delivery, and ignition timing are scheduled in an open loop mode until the engine reaches a pre-determined engine speed and combustion has stabilized to produce minimal hydrocarbons. This determination, of whether the engine is out of the crank mode, is made in step 218 based on engine speed reaching a preselected speed, for example. When the answer to step 218 is "no", the routine returns to step 216. Otherwise, the routine continues to step 220.

In step 220, the routine determines whether the engine is cold. In other words, the routine determines whether the engine coolant temperature is below a predetermined temperature. When the answer to step 220 is "yes", the routine continues to the cold run mode in step 222, which is described in detail with regard to FIG. 5. In general, during the cold run mode fuel is scheduled to produce a lean exhaust air-fuel mixture. Further, ignition timing is scheduled to a retarded (from optimal torque) value to minimize hydrocarbon emissions with a cold catalyst. Since the retarded ignition timing and lean air-fuel combustion produces less torque than advanced ignition timing and rich air-fuel mixtures, engine speed may fall. To counteract this, engine rpm can be maintained by increasing engine air flow, thereby increasing overall cylinder air charge. Further, this increase in air flow has a small additional benefit of providing a small additional amount of heat to the catalyst.

Next, in step 224, the routine determines whether port oxidation is required. Generally, this decision is based on information from an estimated exhaust flange temperature, catalyst temperature, diagnostic sensors, and the throttle (or pedal) state. If the catalyst and exhaust flange have reached a predetermined temperature, or a throttle transition has occurred before the auto ignition temperature is reached, port oxidation is disabled. If port oxidation is disabled, the engine will continue to operate in the cold run mode until a determination is made to enter the run mode. If port oxidation is enabled, the engine will continue in cold run mode until the estimated exhaust flange temperature is greater than the auto ignition temperature, for example, at which point the oxidation mode will be entered. This is described more fully with regard to FIG. 6.

Figure 7:
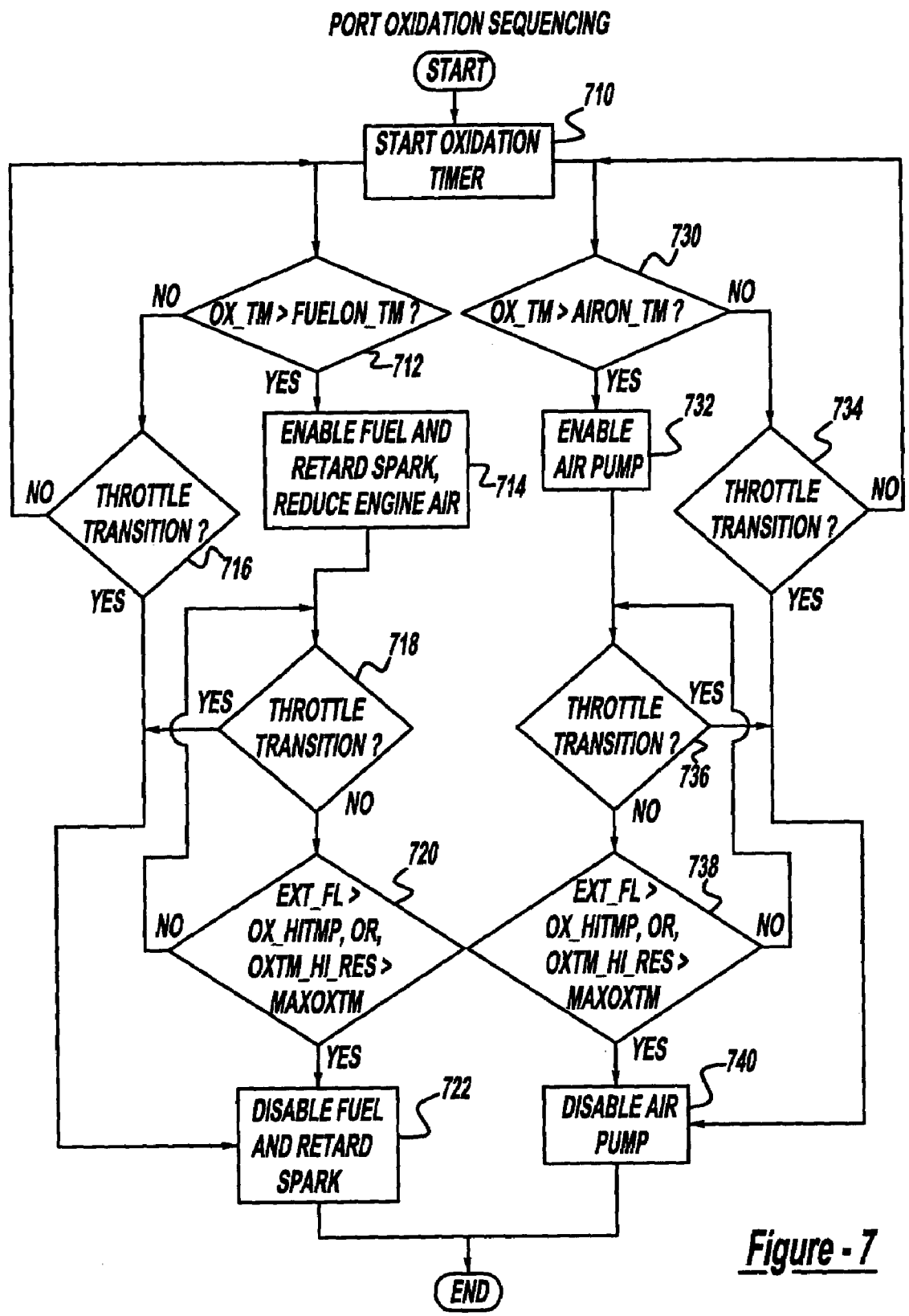

When the answer to step 224 is "yes", the routine continues to step 226 to sequence the port oxidation, as described more fully with regard to FIG. 7. Generally, the routine considers various environmental inputs to determine if port oxidation is required. If port oxidation is not required, the cold run mode is maintained until the routine determines that run mode is appropriate. Cold run mode is calibrated so that hydrocarbon emissions are minimized without drivability concerns. If port oxidation is required, a transition occurs from the cold run mode to the port oxidation mode. In this case, engine ignition is retarded further, and the injected fuel is increased to significantly enrich the exhaust air-fuel ratio (as rich as 25% additional fuel). Further, the external air pump is enabled. Port oxidation is enabled until a throttle input is detected, a target exhaust flange temperature is reached, or a timer reaches a predetermined limit. When the auto ignition temperature is reached, a second timer is started. At this point, fuel, air, and ignition timing can be individually controlled to achieve optimal hydrocarbon emissions. In one example, the engine discontinues port oxidation by transitioning to stoichiometric operation (oscillations about stoichiometry via feedback air-fuel control using oxygen sensors in the exhaust), i.e., maintaining the exhaust air-fuel ratio about the stoichiometric point.

When transitioning to the port oxidation mode, the air-fuel ratio is switched to rich and the air pump is activated. However, these actions may not occur at exactly the same time. In other words, since air pump hose lengths and pump capacities differ based on the particular configuration, one may require fuel to be initiated before air while other configurations may require air before fuel.

Air pump flow is estimated by reading pump voltage, pressure across the pump, and ambient pressure and temperature. I.e., air pump compensation for barometric pressure and external temperature can be achieved. The amount of fuel enrichment during port oxidation is determined from the estimated air pump air mass, with potential additional feedback using the oxygen sensor. In other words, during port oxidation, a desired engine air-fuel ratio is selected to achieve auto-ignition in the exhaust with the introduced air from the pump. Typically, this ratio is richer than about 12:1. Then, based on the actual combustion rich air-fuel ratio, and the air entering the engine (measured via sensor 110), a required air pump air flow is calculated. As an example, the following equation can be used to calculated the desired air flow through the air pump:

$$\text{air\_pump\_desired\_air} = (1 - \lambda s / \lambda c) * MAF$$

where $\lambda s$ is the stoichiometric air-fuel ratio and $\lambda c$ is the rich combustion air-fuel ratio. This provides a near stoichiometric mixture of rich exhaust gasses with introduced air. Alternatively, a slightly lean or rich overall mixture can be used if desired. Further, this desired airflow is then used to determine a pump command voltage (Vp) based on ambient operating conditions as described above herein.

Additionally, the estimated exhaust gas temperature includes compensation for the heat generated by the exothermic reaction. While in the port oxidation mode, the routine observes the throttle sensor to determine if a transition has occurred. If a transition has occurred, the timer is stopped and fuel injection and ignition timing are transitioned to the run mode conditions.

The inventors of the present invention have recognized that detecting transitions can provide improved operation. In particular, as the driver moves the throttle, exhaust pressure raises thereby limiting air added by the air pump. In addition, the engine air mass increases significantly to the point where the external pump may not be able to supply sufficient exhaust air, as described herein. Since the air pump may not be able to overcome the additional exhaust pressure, the exothermic reaction can be extinguished thereby increasing emissions. Therefore, port oxidation is disabled if a throttle transition occurs, the target temperature is reached, or a timer exceeds a predetermined limit. The shut-off sequence allows independent control of ignition timing, air, and fuel like the initiating sequence.

Next, in step 228 the routine transitions to the run mode as described in more detail below with regard to FIG. 8. In general terms, since port oxidation and the cold run mode are substantially different than engine operation during the run mode, the engine is transitioned between the different modes. Exiting the cold run mode and the port oxidation mode requires moving from the retarded ignition timing to a base ignition timing. Therefore, the ignition timing is ramped over time to minimize disturbing the engine speed/torque, which is being maintained during the idle conditions via adjustments to the idle air bypass valve. Further, port oxidation requires a rich air-fuel mixture so that fuel is ramped toward stoichiometry to enter the run mode. Further, cold run mode utilizes a lean mixture to minimize hydrocarbons. Therefore, in this case, fuel is ramped rich to stoichiometry to enter the run mode.

Engine air is reduced during the port oxidation due to the additional torque provided by the rich air-fuel ratio. When port oxidation is exited, the ignition timing transition is done over a sufficiently long time period so that the air flow reduction via the idle air bypass valve compensates to maintain the desired engine speed. Cold run mode requires excess engine air flow to maintain engine speed. As the engine warms, engine air is decreased as engine friction decreases thereby allowing the engine to maintain relatively constant speed. To transition from the cold run mode to the run mode, both ignition timing and air from the idle air bypass are coordinated to maintain substantially constant engine speed.

Finally, the routine continues to step 230 where the engine enters the run mode.

Figure 3:
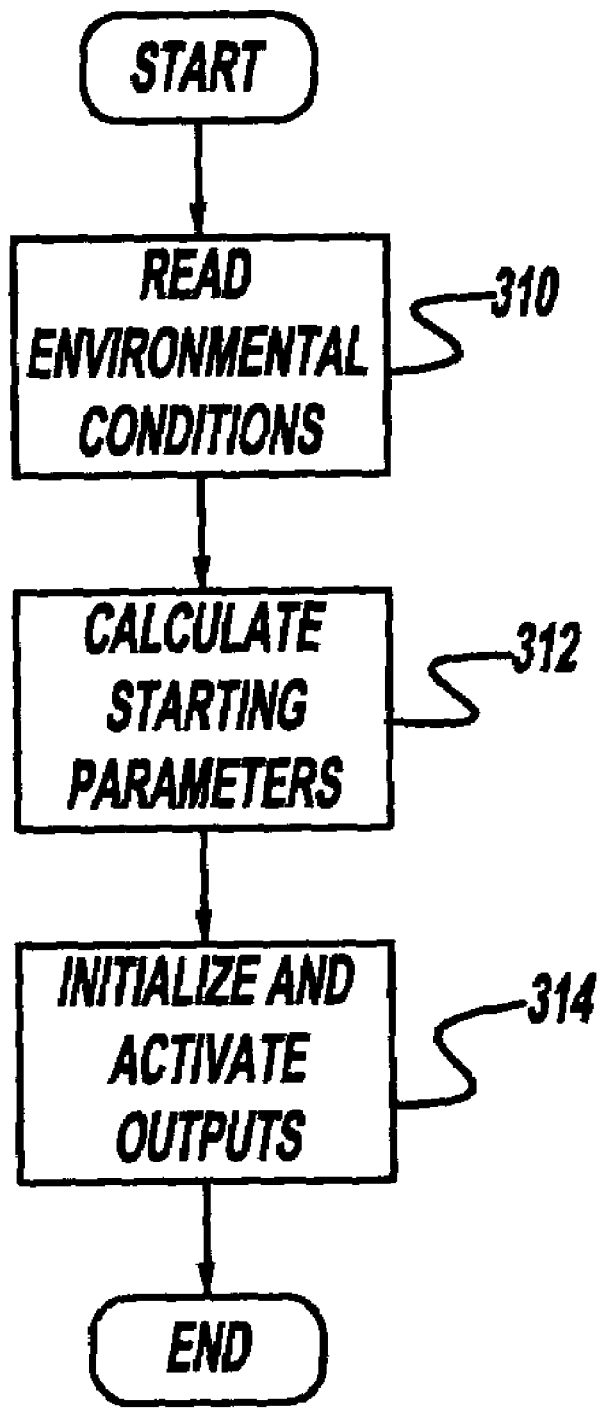

Referring now specifically to FIG. 3, the initialization of the starting sequence of step 212 is described. First, in step 310, the routine reads environmental conditions. For example, the routine reads the engine coolant temperature, ambient air temperature, barometric pressure, battery voltage, and engine off timers. For example, the engine-off timers estimate the time since the last engine running condition. Then, in step 312, the routine calculates starting parameters. These starting parameters include the required fuel injection amount and the initial idle air bypass valve position. Further, the starting parameters include compensation that may later be applied to the air pump to account for pump temperature, pressure, and voltage, as well as the ambient conditions. In other words, based on the initial pump temperature, adjustment may be later made to the control values sent to control the pump. As an example, if the initial pump temperature is very cold due to cold environmental conditions, additional voltage may be needed to reach the same additional air flow that could be provided at a lower voltage if the pump temperature were higher.

Thus, the routine determines a required air amount to be provided by the pump, once it is commenced. To obtain the desired air quantity from the pump (which is determined from the rich air-fuel ratio that the engine will combust, as well as the engine air flow amount), compensation for environmental conditions is used. In an alternative embodiment, the air pump operates at full airflow whenever activated and the engine controller maintains exhaust air-fuel ratio by adjusting fuel injection amount, or desired air-fuel ratio. I.e., the pump is simply turned on and off, and the mixture ratio is maintained by adjusting the fuel injection amount. Continuing with FIG. 3, in step 314, the routine initializes and activates outputs.

Referring now specifically to FIG. 4, the engine crank mode of step 216 is described. The routine first determines at step 410 whether the engine is turning. If not, the routine loops back to continue checking whether the engine is turning. When the answer to step 410 is "yes", the routine continues to step 412. In step 412, the routine synchronizes fuel injection with the engine cylinder events. Next, in step 414, the routine outputs and determines the desired open loop ignition timing, fuel injection, and idle air bypass commands. In particular, these initial open loop values can be determined based on parameters such as engine coolant temperature and intake air flow. Further, these parameters can be adjusted and calibrated to produce minimal hydrocarbons. Next, in step 416, the routine determines whether the engine has run up. In particular, the routine determines whether the engine has reached a predetermined engine speed threshold or whether engine combustion has reached a predetermined level of stability. When the answer to step 416 is "no", the routine returns to step 414. Otherwise, when the answer to step 416 is "yes", the routine ends.

Figure 5:
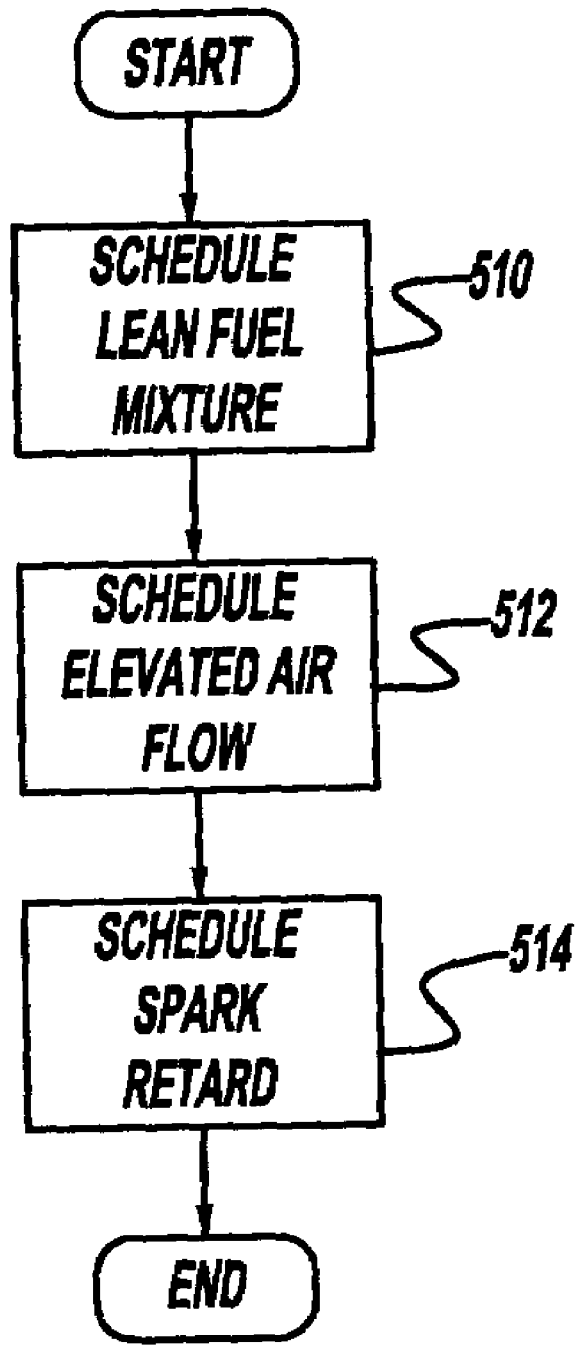

Referring now specifically to FIG. 5, the cold run mode of step 222 is now described. First, in step 510, the routine schedules a lean air-fuel mixture to be combusted in the engine. Typically the lean air-fuel ratio is only slightly lean. For example, typical values are from about 14.8-15:1 air-fuel ratios, where about 14.6 is nearly stoichiometry. Next, in step 512, the desired/scheduled engine air flow is increased. In other words, the idle air bypass valve (or electronic throttle if equipped) is increased to provide additional air flow to compensate for the lean combustion mixture and retarded ignition timing to thereby maintain engine speed. Next, in step 514, the retarded ignition timing is scheduled.

Figure 6:
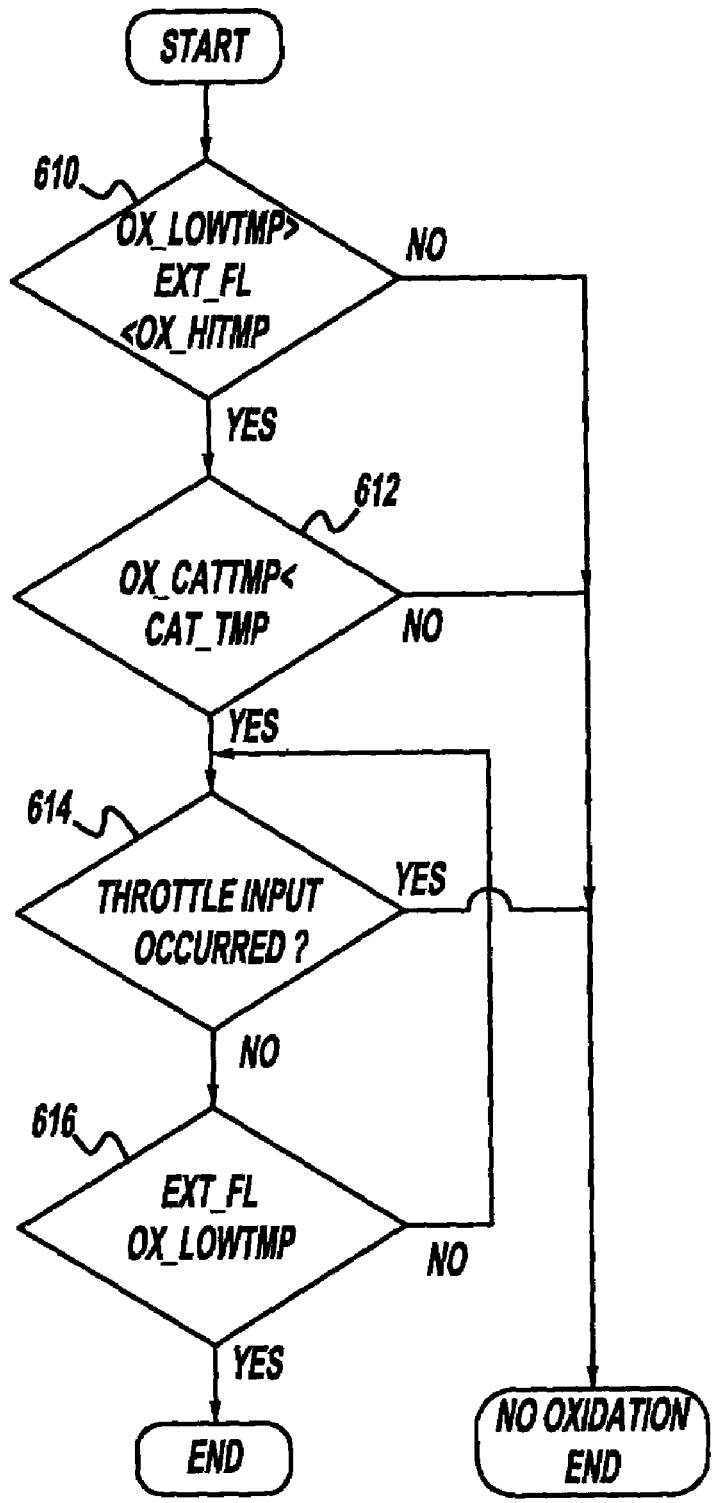

FIG. 6 describes the determination of whether port oxidation is required in step 224. In particular, the routine of FIG. 6 determines whether to enable additional air to be provided by the air pump in the engine exhaust. First, in step 610, the routine determines whether the estimated exhaust manifold flange temperature (ext_fl) is within a predetermined temperature range. In particular, the routine determines whether the flange temperature is between a port oxidation low temperature and a port oxidation high temperature (Ox_low_tmp, Ox_hi_tmp). Note that alternative temperature indications can be used. For example, whether exhaust temperature or catalyst temperature is greater than a pre-selected value for a predetermined time duration, or a predetermined number of engine events.

In an alternative embodiment, exhaust port temperature is used to trigger when to enable the air introduction device. Also, The port oxidation high temperature could be a light-off temperature of the catalyst 20 above which no port oxidation nor cold run mode is necessary.

When the answer to step 610 is "no", the routine determines that no port oxidation is required. Alternatively, when the answer to step 610 is "yes", the routine continues to step 612. Note that the exhaust manifold flange temperature can be either measured from a sensor or estimated based on engine operating conditions. In one example, the flange temperature is estimated based on engine air-fuel ratio, coolant temperature, and ignition timing.

Continuing with FIG. 6, in step 612, the routine determines whether catalyst temperature (cat_tmp) is greater than a catalyst port oxidation threshold temperature (Ox_cat_tmp). Note that the catalyst temperature can be either measured from a catalyst temperature sensor, or estimated using various engine operating conditions such as, for example: engine speed, engine air flow and ignition timing. When the answer to step 612 is "no", the routine determines that no port oxidation is required. Alternatively, when the answer to step 612 is "yes", the routine continues to step 614.

In step 614, the routine monitors whether a throttle input has occurred. In one particular example, the throttle position is measured and the routine determines whether the throttle position has both increased beyond a threshold value, and increased by predetermined value. Alternatively, the routine could monitor whether the engine is still in engine idle speed control. Further still, the routine could measure various other parameters such as the pedal position, or the transmission state to determine whether conditions have changed such that port oxidation is no longer required. Still other conditions can be whether the engine airflow (or MAF) is greater than a predetermined limit value. Alternatively, cylinder charge can be the parameter utilized. Also, the routine could monitor whether the engine is still in engine idle speed control or detect a mass airflow from the mass airflow sensor 110 or other appropriate signals such as a intake manifold air pressure, an intake air temperature and an engine speed and compare the mass airflow with a pre-selected threshold.

In yet another alternative embodiment, the pump is disabled at a preselected estimated pump flow (which can be function of battery voltage, exhaust backpressure, and learned KAM values) which will cause a delta lambda which is too small. Optionally, the pump can be re-enabled if the vehicle returns to a low load. Otherwise, the pump is simply turned on once per vehicle/engine startup. Alternatively, the pump could be left running (but deadheaded) until the catalyst is warm enough to allow for the return to idle condition.

When the answer to step 614 is "yes", the routine discontinues port oxidation. Alternatively, when the answer to step 614 is "no", the routine continues to step 616.

In step 616, the routine determines whether the exhaust manifold flange temperature is greater than the lower port oxidation temperature threshold (Ox_low_tmp). When the answer to step 616 is "no", the routine returns to step 614. Alternatively, when the answer to step 616 is "yes", the routine allows port oxidation and ends.

Referring now to FIG. 7, the port oxidation sequencing of step 226 is now described. First, in step 710, the routine starts the oxidation timer. From step 710, the routine has two independent flow paths starting from steps 712 and 730, respectively. In step 712, the routine determines whether the oxidation timer (Ox_tm) is greater than the allowed fuel enrichment timer (fuel_on_tm). If the answer to step 712 is "yes", the routine continues to step 714 where the enrichment fuel is enabled and the ignition timing is further retarded and the engine air flow is reduced. In this way, engine speed is maintained and a change in engine torque is minimized since the increased torque from the fuel enrichment is counteracted by the retarded ignition timing and reduced engine air flow. Air-fuel control during port oxidation enablement is further described in FIGS. 13-15, below.

Alternatively, when the answer to step 712 is "no", the routine continues to step 716 where the routine determines whether a throttle transition has been detected. As described above herein, there are various methods to detect throttle transitions, such as based on a pedal position, or various other methods. When the answer to step 716 is "no", the routine returns to step 712. Otherwise, when the answer to step 717 is "yes", the routine continues to step 722 described below herein.

Continuing with FIG. 7, from step 714 the routine continues to step 718. In step 718, the routine determines whether a throttle transition is detected similarly to step 716 (and step 614). If the answer to step 718 is "yes", the routine continues to step 722. Alternatively, when the answer to step 718 is "no", the routine continues to step 720. In step 720, the routine determines whether either the flange temperature is greater than the upper port oxidation threshold (Ox_hi_tmp) or the high resolution oxidation timer (Oxtm_hires) is greater than a maximum allowed on time (MaxOntm). If the answer to step 720 is "no", the routine returns to step 718. Alternatively, when the answer to step 720 is "yes", the routine continues to step 722 where the fuel enrichment and ignition timing retard are disabled.

Similarly, from step 710 the routine determines in step 730 whether the oxidation timer is greater than an air pump ontime (airon_tm). When the answer to step 730 is "yes", the routine continues to step 732 and enables the air pump. Alternatively, when the answer to step 730 is "no", the routine continues to step 734 to detect whether a throttle transition has occurred. When the answer to step 734 is "no", the routine continues to step 730. Alternatively, when the answer to step 734 is "yes", the routine continues to step 740 described below herein.

From step 732, the routine continues to step 736 where a determination is made as to whether a throttle transition has occurred. If the answer to step 736 is "yes", the routine continues to step 740. Alternatively, when the answer to step 736 is "no", the routine continues to step 738. In step 738, the routine determines whether the exhaust flange temperature (ext_fl) is greater than the upper port oxidation temperature threshold or whether the high resolution port oxidation timer is greater than the maximum on time in a manner similar to step 720. When the answer to step 738 is "no", the routine returns to step 736. Alternatively, when the answer to step 738 is "yes", the routine continues to step 742 to disable the air pump.

Referring now to FIG. 8, which is indicated in step 228 (FIG. 2), a routine for transitioning to the run mode is described. First, in step 810, the routine ramps the enriched fuel towards stoichiometry via closed loop air-fuel ratio control using the exhaust gas oxygen sensors. Next, in step 812, the routine ramps the engine air and ignition timing while maintaining engine rpm via feedback idle speed control.

Referring now to FIG. 9, a graph of exhaust manifold temperature indicates operation according to the present invention. In particular, FIG. 9 shows exhaust manifold temperature as a function of time. FIG. 9 illustrates how the routine determines whether to enable the additional air from the air pump with rich fuel combustion, known as port oxidation. In this example, the engine is started at T1. As the engine starts, exhaust manifold temperature starts to rise and continues until time T2. At time T2, the exhaust manifold reaches the oxidation temperature (approximately 500 to 800 degrees F.) at which time conditions will support the exothermic reaction of air from the air pump added to the exhaust with rich combustion gases. At this point, exhaust manifold temperature starts to rise at a higher rate until time T3. At this point, the temperature reaches the upper threshold and the air from the air pump is discontinued.

Figure 10:
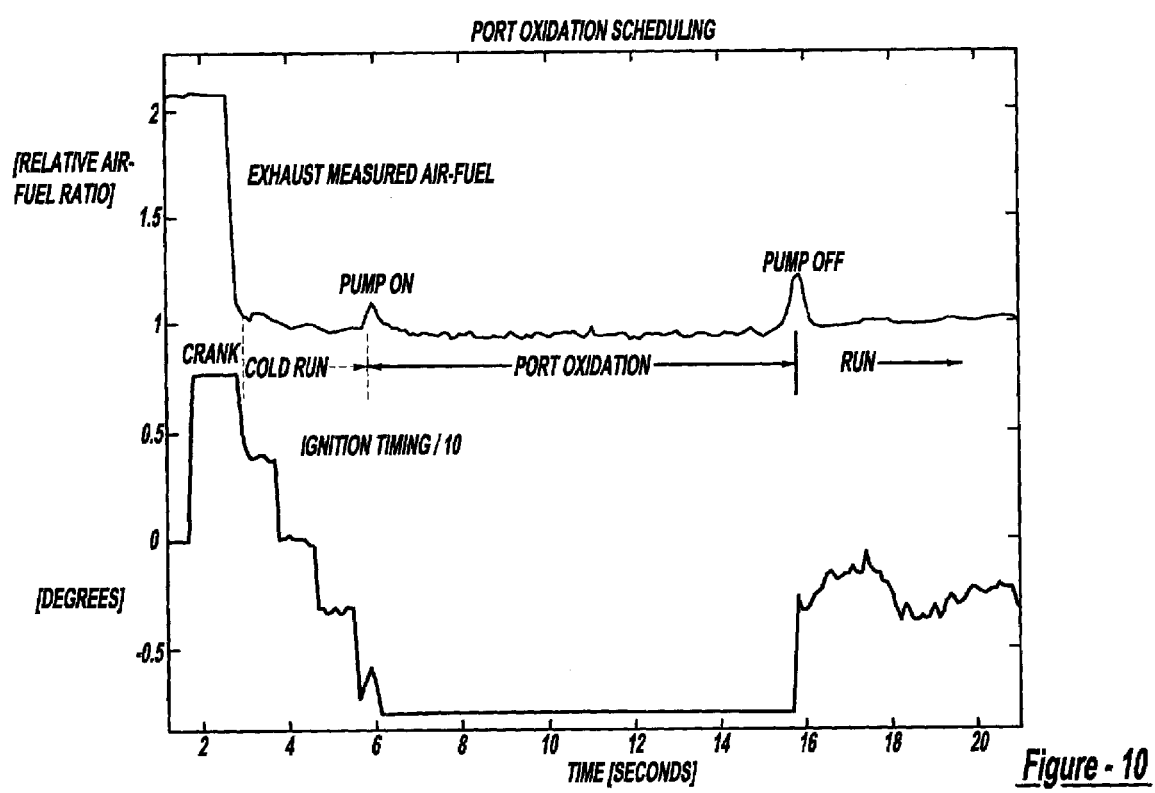

Referring now to FIG. 10, the graph illustrates measured exhaust air-fuel ratio upstream of the catalyst along with ignition timing (divided by a factor of 10). These values are plotted versus time after an engine start. The value of one for the air-fuel ratio indicates near stoichiometry. Further, a value of zero indicates base ignition timing. The graph shows how ignition timing is gradually retarded during the cold run mode. Then, at approximately six seconds, the pump is engaged and the port oxidation is enabled. Then, at approximately 15-½ seconds, the pump is disengaged and the run mode starts, while ignition timing is advanced. Note that while the measured exhaust air-fuel ratio indicates relatively close to stoichiometry during the port oxidation mode; this is because the rich exhaust gases are reacting with the air from the air pump so that the sensor measures near stoichiometry.

As such, the present invention in one embodiment, operates lean, with ignition timing retarded, with no secondary air added via the air introduction device if exhaust temperatures is less than a first temperature limit during an engine cold start. If temperature is greater than the first limit but less than a second limit, the engine operates with secondary air and rich enough to support auto-ignition in the exhaust between the rich exhaust gas and the secondary air. Next, when temperature is greater than the second limit, the engine can operate at stoichiometry without secondary air. In other words, after the engine has reached the second limit, the engine can operate to maintain the exhaust gas about stoichiometry without additional air injection.

Finally, when operating with secondary air, the engine can be returned to enleanment with retarded ignition timing if a non-idle condition occurs. Alternative, engine air mass, cylinder charge, or another indication of air amount can be used.

One reason for monitoring the idle/non-idle state, or some other indication of whether airflow has increased beyond a threshold, is that it prevents degradation in vehicle fuel economy. In other words, the present invention recognizes that to achieve the auto-ignition in the exhaust gas, the combustion air/fuel should preferably be richer than approximately 12:1. As such, if airflow increases substantially, then the amount of excess fuel increases proportionally. This can degrade fuel economy if performed. Further, the present invention recognizes that the air introduction device may not be able to provide enough air to go with all of this excess fuel. Thus, the disadvantage of incomplete burning of excess fuel is also avoided.

The present invention, in another embodiment, provides a method for operating an engine with an emission control device in an exhaust system of the engine, and an air introduction device coupled to the engine exhaust system. The method comprises operating the engine in a first mode during cold idle conditions where the engine inducts a lean air-fuel mixture and ignition timing is retarded, operating the engine in a second mode, after said first mode, during cold idle conditions where the engine inducts a rich air-fuel mixture and the air introduction device adds air to the engine exhaust, and exiting the second mode based on an increase in pedal position of a vehicle pedal actuated by a vehicle driver.

In this way, the less fuel efficient second engine operating mode is terminated when the engine operates at increased air flows. In other words, the rapid exhaust heating provided by a rich engine air-fuel ratio and excess air added to the engine exhaust is carried out during conditions where the impact on vehicle fuel economy is minimized. As such, the inventors herein have recognized that such rich operation should be conducted during low engine air flow conditions to minimize this negative impact on vehicle fuel economy.

Figure 11:
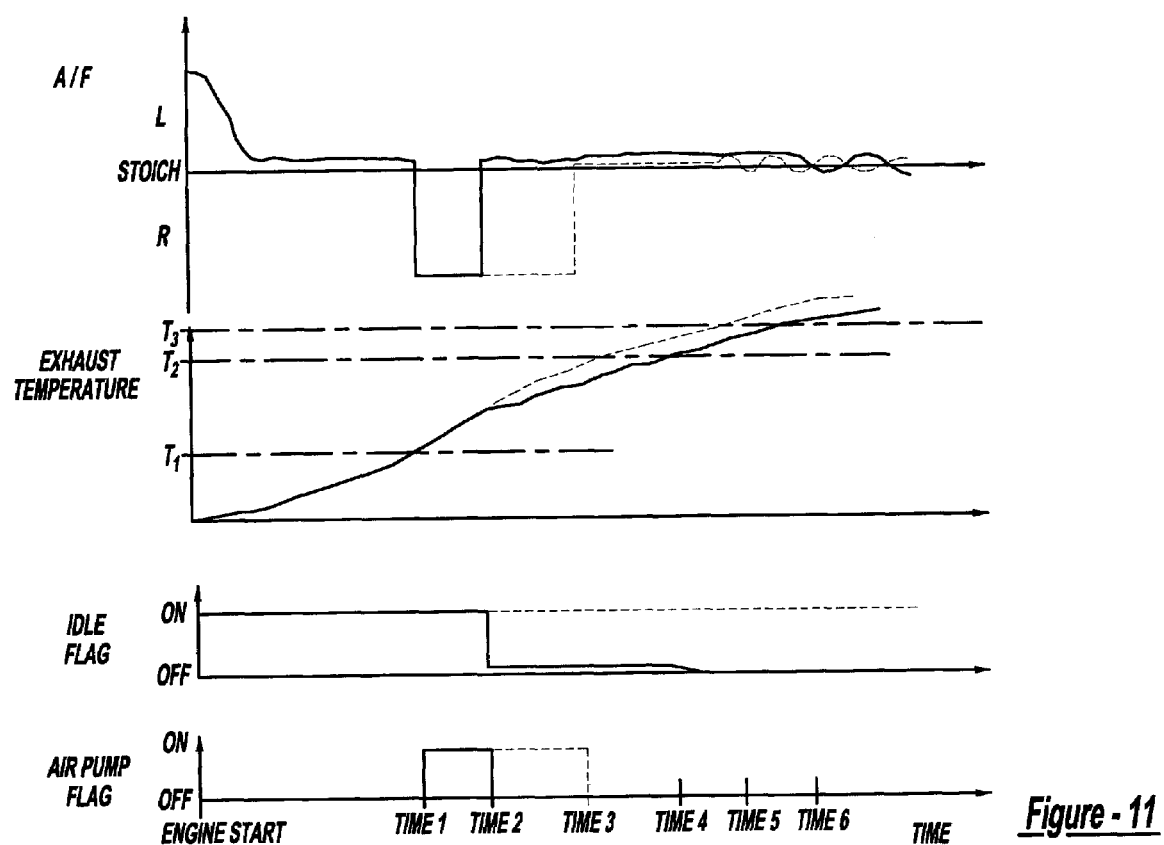

This operation can be further explained with reference to FIG. 11. The top graph of FIG. 11 shows engine air-fuel ratio as measured by a UEGO sensor upstream in the exhaust manifold. Note that the high initial lean reading is because the sensor is not yet reached operating temperature. The second graph from the top illustrates exhaust temperature (exhaust manifold temperature in this example). The third graph from the top illustrated the idle flag (on indicates the engine is in the idle mode). The bottom graph illustrates the air pump flag (on indicates the air pump is pumping air into the exhaust manifold).

Note that the top graph shows air-fuel ratio measured upstream of the air introduction device, whereas the embodiment described herein uses a sensor that measures exhaust air-fuel ratio downstream of the air introduction device. I.e., in the example described in these figures, the air-fuel ratio measured by a UEGO sensor located in place of sensor 16 would show substantially a stoichiometric mixture from time1 on. Thus, the top graph of FIG. 11 could be considered a commanded in cylinder air-fuel ratio, as described below.

The engine is first operated lean with retarded ignition timing after the engine start until time1. At time1, the exhaust temperature (e.g., manifold temperature) reaches first threshold T1. At this time, since the engine is in the idle mode (note, in an alternative embodiment engine airflow is used in place of the idle flag), the engine transitions to rich operation and starts adding air via the air pump in the engine exhaust. In the first case (solid line), the engine exits the idle mode at time2. As such, the engine transitions back to lean operation with retarded ignition timing.

The dashed line is a second case where the engine remains in the idle mode during the entire warm-up. At time3 in the second case, the engine reaches the second temperature threshold T2 indicating that the port oxidation mode is no longer required and thus transitions back to lean operation with retarded ignition timing. This continues until time5, where the temperature reached threshold T3, and the engine transitions to oscillation about stoichiometry.

Returning to the first case, from time2 to time6, the engine operates with retarded ignition timing. At time6, the temperature reaches T3 and the engine then transitions to oscillations about stoichiometry.

Figure 12:
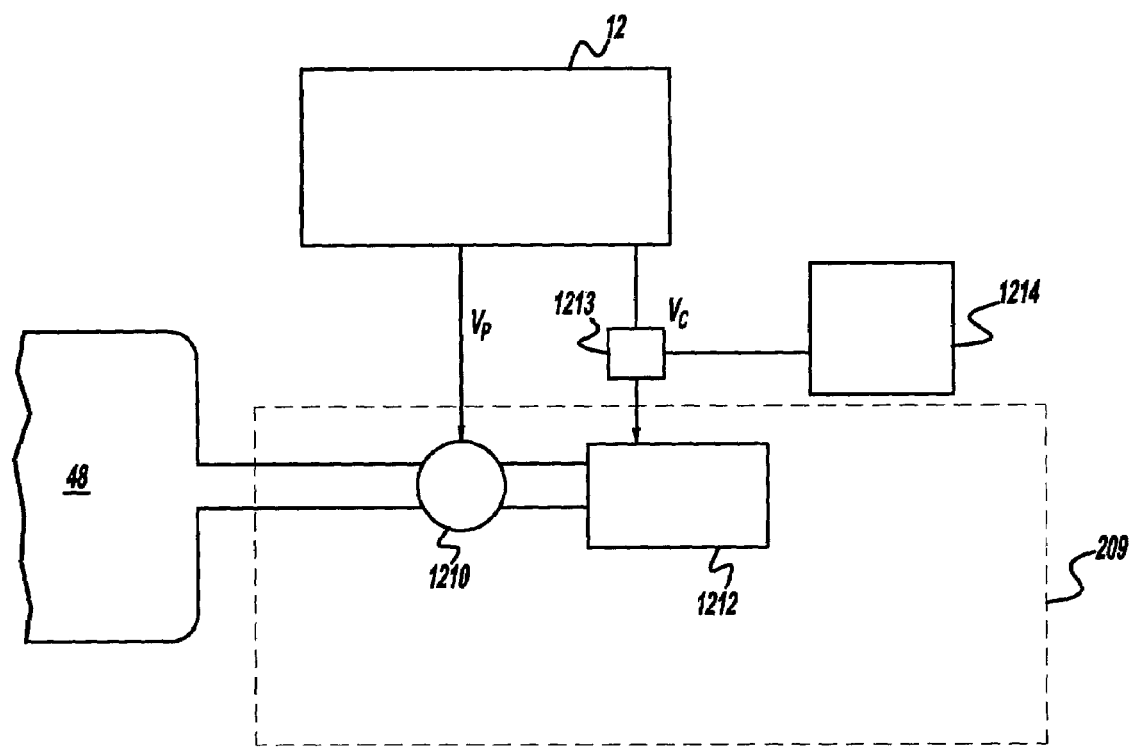
FIG. 12 shows details of the air introduction device.

Referring now to FIG. 12, an example air introduction device 209 is shown. In this case, air pump 1212 is coupled to a control valve 1210. The pump is either on or off based on pump command voltage Vc, which is fed to relay 1213, powered by the battery 1214. The airflow is controlled via the control valve 1210.

Note that this is just one configuration. In an alternative configuration, the flow is simply controlled by adjustment of the voltage applied to the pump.

Figure 13:
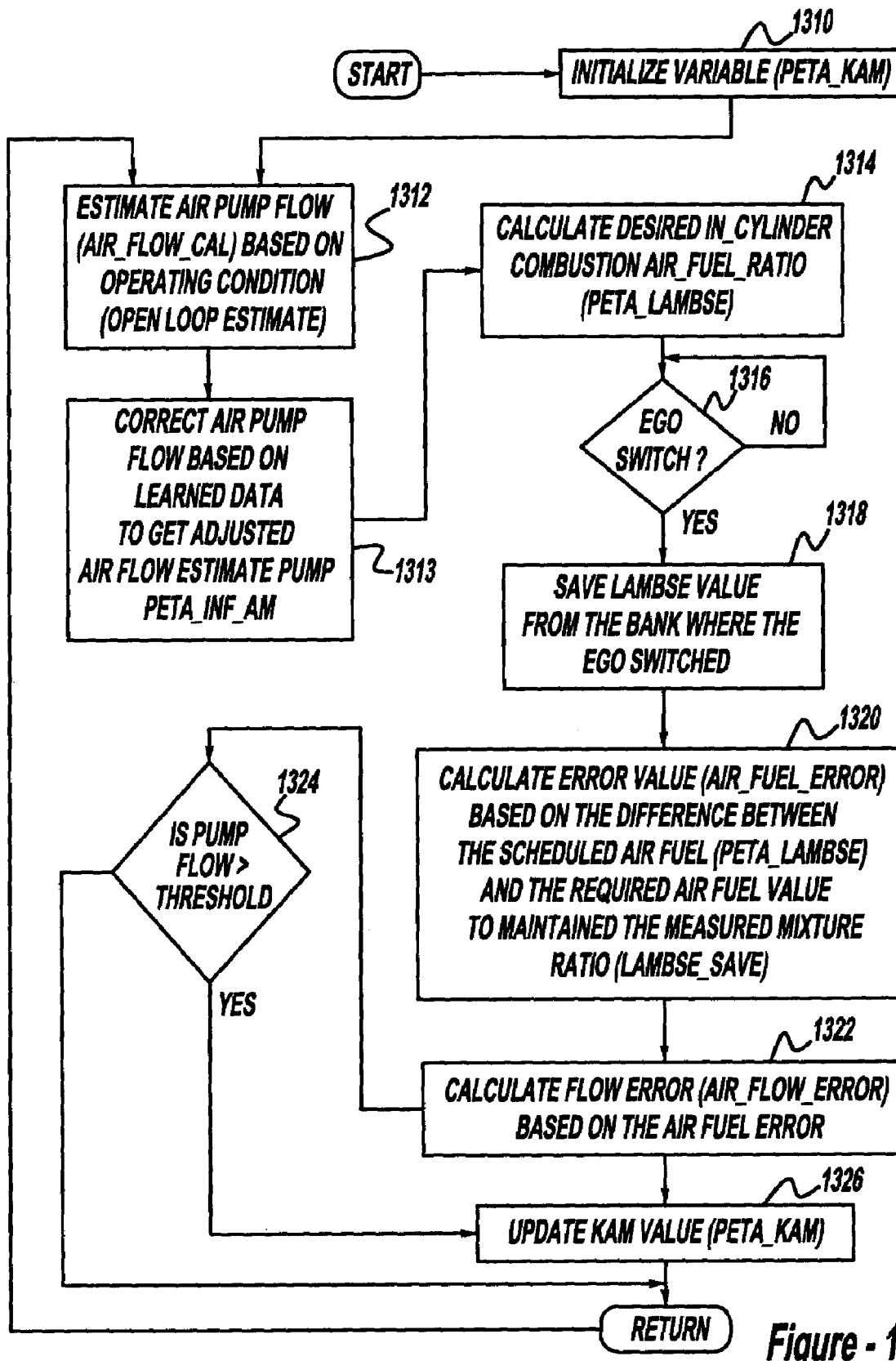

Referring now to FIG. 13, a routine is described for controlling air-fuel ratio of the engine to compensate for air introduced via the air introduction device 209. This particular routine attempts to maintain the mixture of combustion exhaust gases and air introduced via the air introduction device at an overall mixture air-fuel ratio of approximately the stoichiometric value (relative air-fuel ratio of 1). Note, however, another air-fuel mixture target could be chosen, especially if UEGO air-fuel ratio sensors are used.

In general, the routine of FIG. 13 uses feedback from exhaust air-fuel ratio sensors to adaptively learn an estimate of air flow introduced into the exhaust via the air introduction device. The routine only enables learning of the pump air flow when the pump is on and feedback air-fuel ratio control is executed. During this learning of pump air flow, the control algorithms assume that errors due to fuel injector offsets, errors from the mass air flow sensor, and bank to bank or cylinder to cylinder variations have already been learned and accounted for during non-port oxidation mode. In this way, it is possible to isolate the air flow error due to estimation errors of the pump air flow.

Referring now specifically to FIG. 13, in step 1310 the routine initializes various variables stored in the KAM memory of controller 12. In particular, the variable (PETA_KAM) is initialized to the most recently updated value from previous engine operation. Upon initial engine production, this variable is set to zero.

In step 1312, the routine estimates air flow introduced via the air pump based on engine operating conditions. In other words, the routine determines a feed-forward, or open-loop, estimate based on operating conditions. The estimate of air pump flow (AIR_FLOW_CAL) is based on measured air mass flow (MAF) and battery voltage using the equation below.

AIR_FLOW-CAL=FNAM(air mass)*
FNVOLT(battery voltage)

where, FNAM is a calabratable function of air mass, or MAF, and FNVOLT is a calabratable function of battery voltage.

In an alternative embodiment, the air flow can be estimated based on exhaust pressure. In other words, as described above herein, the present inventors recognize that the amount of air flow introduced via the air pump (which is a non-positive displacement pump) is affected by exhaust back pressure and supply voltage. Further, various corrections can be applied to account for variations in atmospheric pressure and atmospheric temperature.

Continuing with step 1313, the routine corrects the air pump estimate based on learned data to obtain an adjusted air pump flow estimate (PETA_INF_AM) as shown in the equation below.

PETA_INF_AM=AIR_FLOW_CAL*
(1+PETA_KAM)

where AIR_FLOW_CAL is a calabratable adaptive gain parameter.

This adjusted estimate is based on the previous learned variable (PETA_KAM). Updating of this parameter is described below herein with particular reference to step 1326. This approach thus uses a single learned value assuming that pump flow will approximately be reduced by the same fraction under all conditions to provide the inferred air pump flow used above. In particular, since the open loop estimate attempts to compensate for variations in applied voltage, back pressure, and atmospheric conditions, only a single parameter is needed to compensate for manufacturing variations and other slowly varying affects such as pump degradation.

However, in an alternative embodiment, the learned correction value can be stored across various operating conditions such as, for example: engine speed and load, or estimated exhaust gas temperature. In other words, two values, one for each bank to account for bank-to-bank variations in the air distribution system, could be used. Or, in the event that separate pumps are used for each bank, multiple values could be used to account for differences in the pumps. Further, one could assume a pre-determined bank-bank difference (when using one pump) and apply a bank specific multiplier while using the single value of PETA_KAM for the whole system.

Continuing with FIG. 13, in step 1314 the routine calculates a desired end cylinder combustion air-fuel ratio (PETA_ LAMBSE) as shown in the equation below.

PETA_LAMBSE=(AM*(PETA_LAMBDA_DES))/
(AM+(PETA_INF_AM)), where AM is the air mass determined from the mass air flow sensor (MAF), PETA_LAMBDA_DES is the desired mixture air-fuel ratio (PETA_LAMBDA), and PETA_INF_AM is the estimated air flow via the air introduction device.

This desired end cylinder air-fuel ratio is thus calculated based on the desired mixture air-fuel ratio (PETA_ LAMBDA), measured air mass (AM) and the estimated air flow via the air introduction device (PETA_INF_AM). Note that according to the present invention, it is possible to provide learning of air pump flow even if the mixture ratio is a value other than the stoichiometric ratio. As an alternative, a ratio (PETA_RAT) can be calculated as shown in the equation below.

PETA_RAT=AM/(AM+PETA_INF_AM)

In step 1316, the routine determines whether the EGO sensor 16 has switched. If the answer to step 1316 is "no", the routine continues to monitor for an EGO switch.

Alternatively, if the answer to step 1316 is "yes", the routine continues to step 1318. In step 1318, the routine saves the final air-fuel ratio value determined from close loop air-fuel ratio control when the EGO sensor switched (i.e., LAMBSE_SAVE is set to the current LAMBSE, on a per bank basis if a multi bank engine is used). This value is calculated as described below herein with particular reference to FIG. 14. The value is saved, and further, the routine keeps track of which bank ([BANK_TMP]) the air-fuel ratio value is saved from in the case of a multi-cylinder bank engine. Then, in step 1320, the routine calculates an error value (AIR_FUEL_ERROR) based on the difference between the scheduled air-fuel ratio (PETA_LAMBSE) and the required final air-fuel value necessary to maintain the measured mixture ratio (LAMBSE_SAVE) as shown by the equation below.

AIR_FUEL_ERROR=14.6*(LAMBSE_SAVE[BANK_TMP]−
PETA_LAMBSE)

This difference seems to be a result of an error in the air-pump flow estimation and the air flow air is calculated from the air-fuel ratio error and the current fuel flow rate in step 1322 as shown in the equation below.

AIR_FLOW_ERROR=AIR_FUEL_ERROR*
LBMF_INJ[BANK TMP]*(NUMCYL/2)*N where N is the engine speed, NUMCYL is the number of cylinders in the engine, and LBMF_INJ is the lbm mass of fuel injected from the injectors.

Again, the routine accounts for a multi-bank system by selecting the fuel flow from the bank corresponding to the saved air-fuel ratio value.

Then, in step 1324, the routine determines whether the pump flow is greater than a threshold value. Alternatively, the routine can determine whether the ratio of air-flow to air pump flow (PETA_RAT) is greater than a threshold value. In particular, at low air pump flow (e.g., higher back pressure), other air-fuel ratio errors may overwhelm errors due to changes in pump flow. Thus, according to the present invention, it is possible to only allow learning of pump flow when these errors will be minimized compared to the error in the pump flow. Thus, when the answer to step 1324 is "yes", the routine continues to step 1326 and updates the KAM value (PETA_KAM) as shown by the equation below.

PETA_KAM=PETA_KAM+(PETA_KAM_GAIN)*
(AIR_FLOW_ERROR)/(PETA_INF_AM)

where PETA_KAM_GAIN is a calabratable adaptive learning gain. Step 1316 above assumes a switching sensor is used for sensor 16. An alternate would be to use a wide range sensor (UEGO) as sensor 16 and perform the learning at regular intervals instead of at sensor switch points. An advantage of the wide range sensor would be that updates could be made more frequent, which would facilitate a more complex adaptive system where the learned correction could be evaluated as a function of parameters such as exhaust backpressure or engine air mass, temperature, etc.

Figure 14A:
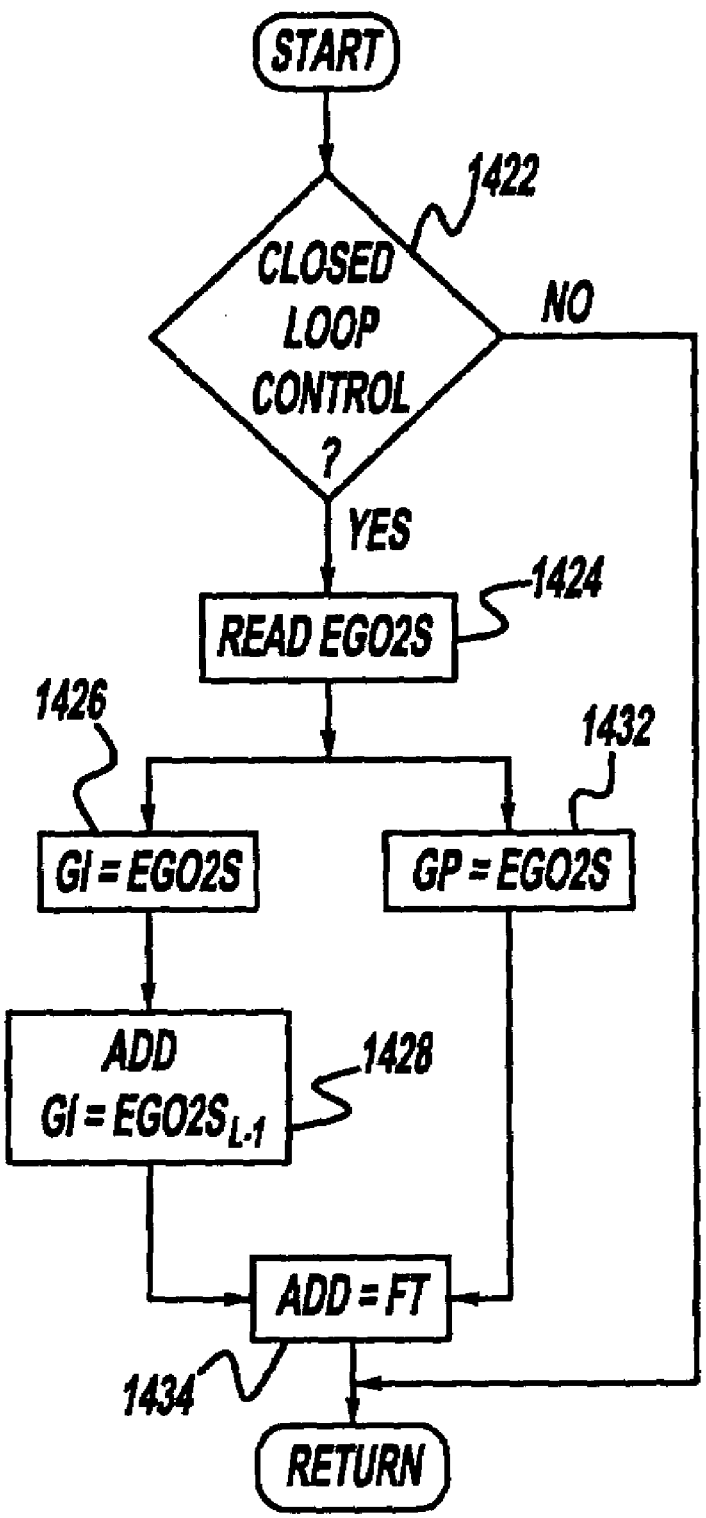

Referring now to FIG. 14A, a flowchart of a routine performed by controller 12 to generate fuel trim signal FT is now described. A determination is first made whether closed-loop air/fuel control is to be commenced (step 1422) by monitoring engine operation conditions such as temperature. When closed-loop control commences, signal EGO2S is read (step 1424) and subsequently processed in a proportional plus integral controller as described below.

Referring first to step 1426, signal EGO2S is multiplied by gain constant GI and the resulting product added to products previously accumulated (GI*EGO2S$_{i-1}$) in step 1428. Stated another way, signal EGO2S is integrated each sample period (i) in steps determined by gain constant GI. During step 1432, signal EGO2S is also multiplied by proportional gain GP. The integral value from step 128 is added to the proportional value from step 1432 during addition step 1434 to generate fuel trim signal FT.

Figure 14B:
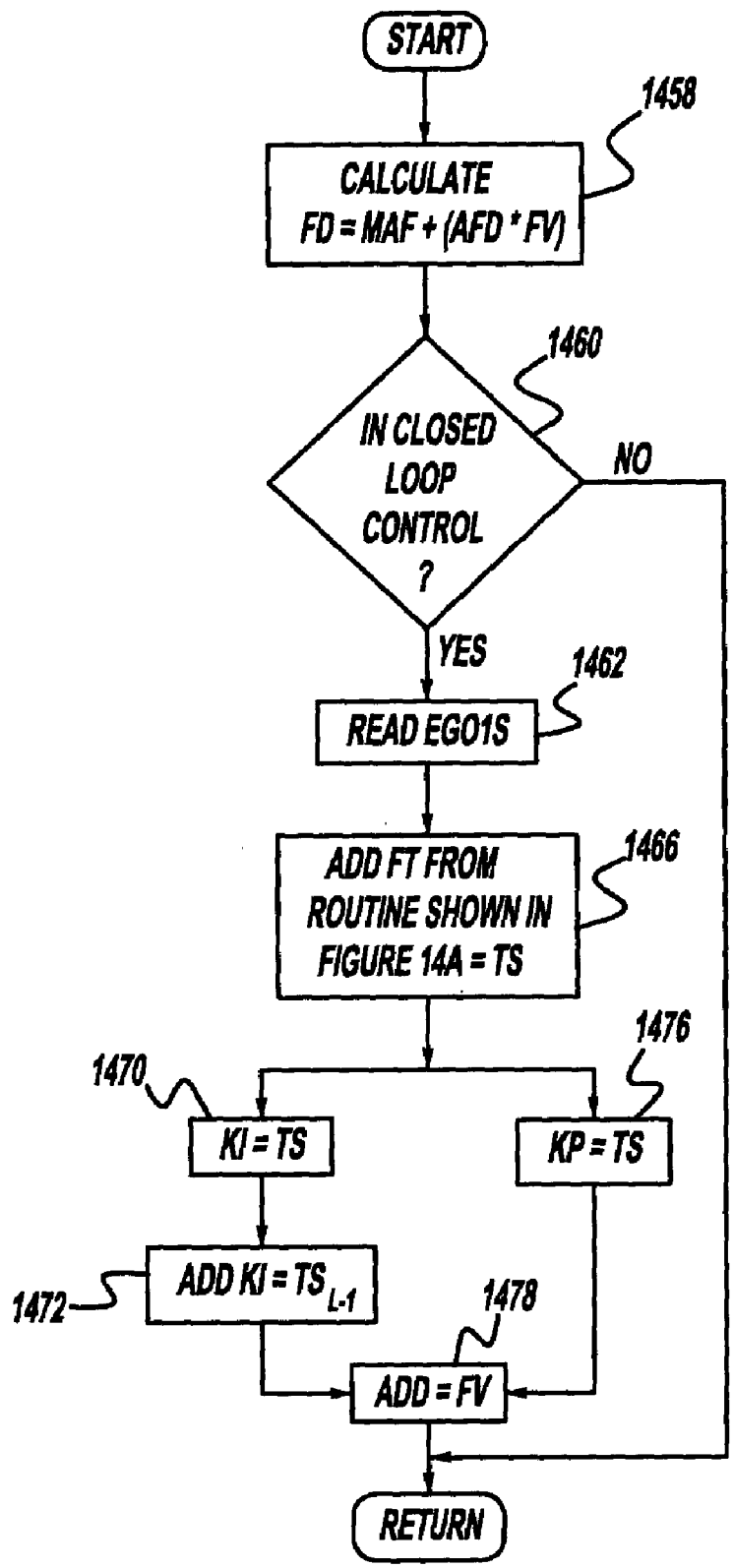

The routine executed by controller 12 to generate the desired quantity of liquid fuel delivered to engine 10 and trimming this desired fuel quantity by a feedback variable related both to sensor 80 and fuel trim signal FT is now described with reference to FIG. 14B. During step 1458, an open-loop fuel quantity is first determined by dividing measurement of inducted mass airflow (MAF) by desired air/fuel ratio Afd (which is PETA_LAMBSE during port oxidation) which is typically the stoichiometric value for gasoline combustion. However, setting AFd to a rich value will result in operating the engine in a rich state. Similarly, setting AFd to a lean value will result in operating the engine in a lean state. This open-loop fuel quantity is then adjusted, in this example divided, by feedback variable FV.

After determination that closed-loop control is desired (step 1460) by monitoring engine operating conditions such as temperature (ECT), signal EGO1S is read during step 162. During step 1466, fuel trim signal FT is transferred from the routine previously described with reference to FIG. 14A and added to signal EGO1S to generate trim signal TS.

During steps 1470-1478, a conventional proportional plus integral feedback routine is executed with trimmed signal TS as the input. Trim signal TS is first multiplied by integral gain value KI (step 1470), and the resulting product added to the previously accumulated products (step 1472). That is, trim signal TS is integrated in steps determined by gain constant KI each sample period (i) during step 1472. A product of proportional gain KP times trimmed signal TS (step 176) is then added to the integration of KI*TS during step 178 to generate feedback variable FV. From this, the closed loop air-fuel value (LAMBSE) is then calculated from the closed loop fuel injection amount (Fd) as:

LAMBSE=MAF/Fd.

Note that during port oxidation, second oxygen sensor 80 may not have reached operating temperature. In this case, feedback generated in FIG. 14A is simply not used and step 1466 can be skipped.

In summary, the above adaptive air pump estimation routine provides the following advantage. Whenever closed loop air-fuel control is possible, the feedback correction can be used to adaptively learn the pump airflow. Further, this adaptively learned air-pump airflow can then be used in later engine starts, even if closed loop fuel control is not possible, to maintain accurate air-fuel control even in the open loop situation. Further, the controller 12 can adaptively learn errors from the fuel injectors, etc., during closed loop fuel control and non-port oxidation conditions. In this way, during learning in the port oxidation mode, the error can be attributed solely to errors in the air pump flow estimate.

Figure 15:
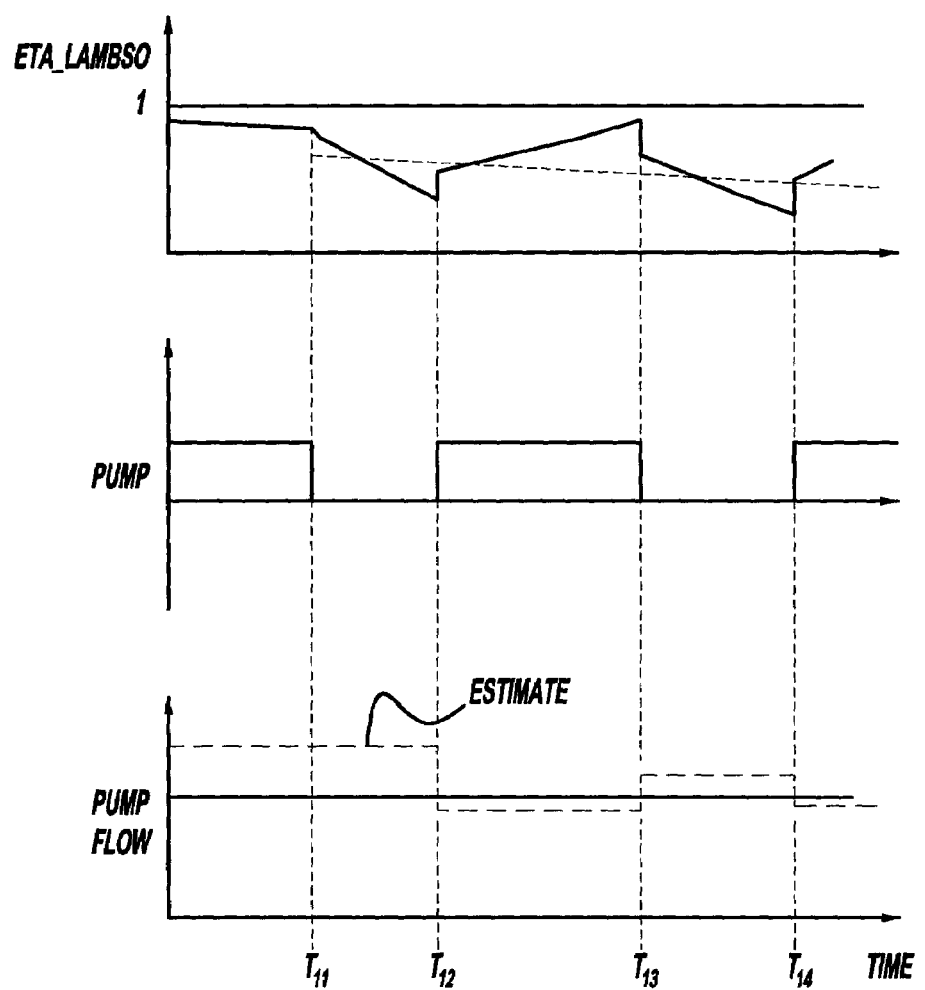

Referring now to FIG. 15, example operation according to the present invention is described illustrating the adaptive learning according to FIGS. 13 and 14. In particular, the top graph of FIG. 15 shows the feedback air-fuel ratio control input (LAMBSE) versus time as a solid line, and the stoichiometric air-fuel ratio as a solid-double-dash line. The middle graph of FIG. 15 shows the feedback sensor value, EGO versus time. Finally, the bottom graph of FIG. 15 shows the pump flow estimate as a dashed line converging toward the actual pump flow (solid line).

At time t11, the engine enters closed loop feedback air-fuel control based on the upstream air-fuel sensor 16, when the sensor switches low, indicating the mixture air-fuel ratio is lean. Therefore, the control input (LAMBSE) is ramped more rich. Then, at time t12, the signal EGO switches high, indicating the mixture of air and burnt gasses is rich. As such, the routine jumps the air-fuel ratio less rich, and begins ramping toward lean (thus illustrating a P-I control action). Further, at time t12 the routine updates the value of PETA_KAM thus adaptively learning a more accurate pump flow value. These processes continue for each EGO switch, as illustrated at time t13 and t14. As also illustrated, the pump flow estimate oscillates around, and converges toward the actual pump flow (which is not measured on the vehicle, but merely shown here to indicate that the estimate is converging toward the actual value).

This concludes the detailed description. As noted above herein, there are various alterations that can be made to the present invention.

We claim:

1. A method for operating an engine with an emission control device in an exhaust system of the engine, and an air introduction device coupled to the engine exhaust system, the method comprising:
  after an engine start, operating the engine with ignition timing retarded from optimal torque timing and combusting a lean air-fuel mixture, where fuel injection is synchronized with engine events;
  continuing said operation until an exhaust system temperature reaches a pre-selected value; and
  after reaching said pre-selected temperature value, operating the engine with a rich air-fuel mixture and commencing adding of air via said air introduction device.

2. The method recited in claim 1 wherein said exhaust system temperature is an exhaust manifold temperature and said pre-selected value is an auto-ignition temperature.

3. The method recited in claim 1 wherein said exhaust system temperature is an exhaust gas temperature.

4. The method recited in claim 1 wherein said rich air-fuel mixture is richer than about 12:1.

5. The method recited in claim 1 wherein said operating the engine with said rich air-fuel mixture and said adding of air via said air introduction device is suspended in response to an indication.

6. The method recited in claim 5 wherein said indication is based on whether the engine is in an idle condition.

7. The method recited in claim 5 wherein said indication is based on whether engine airflow is greater than a predetermined amount.

8. The method recited in claim 1 wherein said air introduction device is an air pump.

9. The method recited in claim 8 wherein a voltage applied to said pump is adjusted to control an amount of air added via said pump.

10. The method recited in claim 9 further comprising determining said amount of air added via said pump based on exterior conditions.

11. The method recited in claim 10 wherein said exterior conditions include at least atmospheric pressure and temperature.

12. The method recited in claim 1 wherein after reaching said pre-selected temperature value, the engine is operated with ignition timing adjusted based on said rich air-fuel ratio.

13. The method recited in claim 1 further comprising adjusting said rich air-fuel ratio based on an amount of air added via said air introduction device.

14. The method recited in claim 1 further comprising adjusting air entering the engine when transitioning from said lean operation to said rich operation.

15. A method for operating an engine with an emission control device in an exhaust system of the engine, and an air introduction device coupled to the engine exhaust system, the method comprising:
  in response to an indication that exhaust temperature is below a first threshold, operating the engine with ignition timing retarded from optimal torque timing to combust a lean air-fuel mixture;
  in response to an indication that exhaust temperature is above said first threshold and below a second threshold, operating the engine to combust a rich air-fuel mixture and adding air to the exhaust system via said air introduction device; and
  in response to an indication that exhaust temperature is above said second threshold, operating the engine near stoichiometry, where timing of adjustments of fuel injection and added air are coordinated with respect to one another.

16. The method recited in claim 15 wherein said rich operation is richer than 12:1.

17. The method recited in claim 15 wherein said air introduction device is a pump coupled to the exhaust system.

18. The method recited in claim 15 wherein said exhaust temperature is an exhaust manifold temperature estimated based on engine operating conditions.

19. A method for operating an engine with an emission control device in an exhaust system of the engine, and an air introduction device coupled to the engine exhaust system, the method comprising:
  when exhaust temperature is below a first threshold, operating the engine with ignition timing retarded from optimal torque timing to combust a lean air-fuel mixture;
  when exhaust temperature is above said first threshold and below a second threshold, operating the engine to combust a rich air-fuel mixture and adding air to the exhaust system via said air introduction device; and
  when exhaust temperature is above said second threshold, operating the engine near stoichiometry, where timing of adjustments of fuel injection and added air are coordinated with respect to one another.

20. The method recited in claim 19 wherein when exhaust temperature is above said second threshold, said engine is operated with ignition timing near optimal torque timing.

21. The method recited in claim 19 further comprising, when exhaust temperature is above said first threshold and below said second threshold, operating the engine to combust said rich air-fuel mixture and adding air to the exhaust system via said air introduction device, and discontinuing said operation when at least one of the following conditions occur: a non-idle condition, or engine airflow is greater than a predetermined amount.

* * * * *